United States Patent [19]

Baumgartner et al.

[11] Patent Number: 4,508,089
[45] Date of Patent: Apr. 2, 1985

[54] METHOD OF REGULATING THE CHARGE OF COMBUSTION GAS DELIVERED TO AN INTERNAL COMBUSTION ENGINE

[75] Inventors: Hans Baumgartner, Viersen; Rainer Südbeck, Duisburg, both of Fed. Rep. of Germany

[73] Assignee: Pierburg GmbH & Co. KG, Neuss, Fed. Rep. of Germany

[21] Appl. No.: 437,551

[22] Filed: Oct. 29, 1982

[30] Foreign Application Priority Data

Nov. 11, 1981 [DE] Fed. Rep. of Germany ....... 3144712

[51] Int. Cl.³ .................... F02D 23/02; F02B 33/36
[52] U.S. Cl. ................................ 123/559; 60/397; 418/137; 418/159
[58] Field of Search ............. 123/559, 564; 60/605, 60/397; 418/137, 159

[56] References Cited

U.S. PATENT DOCUMENTS

| | | |
|---|---|---|
| 2,292,233 | 8/1942 | Lysholm . |
| 3,180,079 | 4/1965 | Freeman .................... 123/559 X |
| 3,925,989 | 12/1975 | Pustelnik .................... 60/605 X |
| 3,958,419 | 5/1976 | Laing . |
| 4,188,918 | 2/1980 | Robbins . |
| 4,463,554 | 8/1984 | Sudbeck et al. .............. 60/397 X |

FOREIGN PATENT DOCUMENTS

| | | |
|---|---|---|
| 413309 | 5/1925 | Fed. Rep. of Germany . |
| 423832 | 1/1926 | Fed. Rep. of Germany . |
| 1903261 | 10/1969 | Fed. Rep. of Germany . |
| WO80/00169 | 2/1980 | PCT Int'l Appl. . |
| 313417 | 6/1929 | United Kingdom . |
| 326172 | 3/1930 | United Kingdom ............ 123/559 |
| 336295 | 10/1930 | United Kingdom . |
| 458350 | 12/1936 | United Kingdom ............ 123/564 |
| 711342 | 6/1954 | United Kingdom . |
| 767880 | 2/1957 | United Kingdom . |
| 1010866 | 11/1965 | United Kingdom . |
| 1262138 | 2/1972 | United Kingdom . |

Primary Examiner—Michael Koczo
Attorney, Agent, or Firm—Toren, McGeady and Stanger

[57] ABSTRACT

In a method of regulating the delivery of the combustion fluid (i.e. air or mixture of air and fuel) to an internal combustion engine (1), the combustion fluid is conducted through a gas engine or positive displacement device capable of operating as a fluid motor or a fluid compressor (2) which is drivingly coupled with the internal combustion engine, and the flow rate through the device (2) is varied in the sense of the desired load change by means of a control device (3, 23) on the device. The positive displacement device (2) may be operated as a fluid motor and/or as a supercharger. As a fluid motor the work done by the expansion of the combustion gas is used to assist the engine (1), whereas the engine (1) drives the gas engine (2) when operating as a supercharger. In a preferred embodiment the device (2) is of the rotary vane type (FIG. 3) and the rotational speed ratio between the internal combustion engine (1) and the device (2) is fixed, the fluid flow rate being varied by a control device which has a displaceable control edge (22) in the gas inlet region (5) of the device for varying the intake volume and which is moved by an actuating lever (15) linked to the load regulator of the internal combustion engine (1). In the embodiment of FIG. 3, the control device comprises a segment (23) of the casing (19) bounding the working space (20) of the gas engine, the segment being rotatable about the vane axis (11). The control edge (22) is formed by one end of the segment (23), and a further control edge (24) may be formed at its opposite end for operating in the gas outlet region (21) if the engine (2) is required to operate as a supercharger in an upper load range.

3 Claims, 6 Drawing Figures

METHOD OF REGULATING THE CHARGE OF COMBUSTION GAS DELIVERED TO AN INTERNAL COMBUSTION ENGINE

This invention relates to a method of regulating the charge of combustion gas delivered to an internal combustion engine, and to apparatus for carrying out the method. The combustion gas may be air or a mixture of air with fuel and/or exhaust gases.

The charging of internal combustion engines with combustion gas, especially in the part load range, does not take place with the desired efficiency. For example, in Otto engines the combustion air at atmospheric pressure is throttled by a throttle valve to the reduced pressure obtaining in the intake pipe of the engine, whereas in diesel engines, depending upon the load demand, a short-fall of excess of the combustion components for the combustion reaction occurs, which can be overcome only by exhaust gas recycling or blowing in of air which is costly in materials and energy.

It is known to connect the intake pipe of an internal combustion engine to a gas engine such as a rotary vane type positive displacement device, capable of operation as a fluid motor or a fluid compressor which is driven by the internal combustion engine and which acts as a supercharger supplying the combustion gas, that is, combustion air, at raised pressure to the internal combustion engine. As a rule, however, a throttle valve or an exhaust gas recycling or air blowing system is used for the part-load range, since supercharging of the internal combustion engine is not desired until higher rotational speeds are reached. This tends to make the efficiency of the internal combustion engine worse, at least in the part-load range, and particularly for diesel engines.

According to the present invention a method of regulating the delivery of combustion gas to an internal combustion engine comprises delivering the combustion gas to the intake through a gas engine which is coupled with the internal combustion engine so as to be driven by the internal combustion engine, and varying the gas flow rate through the gas engine in the sense of a desired change in load on the internal combustion engine by means of a control device on the gas engine.

By this method the efficiency of the combustion gas charge regulation, which is load-dependent, is increased in an energy-saving manner, including both a reduction in throttling losses and also the avoidance or simplification of exhaust gas recycling or similar measures for improving the exhaust gas quality, without the latter suffering due to the omission of such special measures.

The driving coupling between the internal combustion engine and the gas engine may be effected, for example, by a gear mechanism connected at one side directly or indirectly with the crankshaft of the internal combustion engine, and at its opposite side to the drive shaft of the gas engine. This gear mechanism may, amongst other things, comprise a belt or toothed wheel drive. It is recommended, particularly in the case of Otto engines, to choose the gear ratio such that, for two engine revolutions of the internal combustion engine, the delivered volume of the gas engine is equal to the swept volume of the internal combustion engine. The gas engine may be operated as a gas motor, as a supercharger, as a supercharger with partial characteristics of a gas motor, or freely selectable and controllable as a gas motor or as a supercharger.

When operating as a gas or fluid motor, i.e. as a result of a volumetric increase of the combustion gas through the gas engine, the work released by the expansion is supplied to the internal combustion engine via the gear mechanism. It is therefore possible at least partly to feed back to the internal combustion engine, by means of the gas engine, the work to be done in changing the gas pressure. Moreover, in the case of diesel engines, due to the pressure reduction (compared with the state of the art) in the intake pipe, the quantity of combustion components for the combustion process is reduced and therefore, even without exhaust gas recycling, the $NO_x$ emission in the exhaust gas is reduced. Also, the so-called smoke shock of diesel engines at suddenly increased load demand is avoided, since the increased demand for combustion components is satisfied directly (at sonic speed) by the pressure increase in the intake pipe, without a special blowing-in of air or retarding of the injected quantity being required, which generally worsens the dynamic behaviour of the drive unit.

Where the gas engine acts as a gas motor or has at least partial characteristics of a gas motor, and involves internal expansion in which the volumetric increase of the combustion gas takes place within the working (delivery) space, the rotational speed ratio between the internal combusion engine and the gas motor is preferably kept constant and the control device is operated to vary the intake volume of the gas motor, for example by means of displaceable inlet control edges or variable duration inlet valves.

If the gas engine, acting as a gas motor, involves external expansion in which the volumetric increase takes place after the combustion gas leaves the working space, it is preferable that the rotational speed ratio between the internal combustion engine and the gas motor is made variable, the rotational speed ratio being adjusted by the control device according to the particular desired load stage of the internal combustion engine or other operating parameters.

When the gas engine is used as a supercharger, a compressing of the combustion gas takes place within the gas engine and its maximum intake gas volume in conjunction with an appropriately selected rotational speed ratio corresponds to the desired increase in the charge of the internal combustion engine. The gas engine, as described in more detail below, is then preferably operated with a preferably load-dependent further control device by which the charge conditions can be varied.

It has been found that the non-usable constituents of the pressure changes in the combustion gas delivered through the gas engine, that is the losses, are at their minimum value when the method of the invention is carried out isothermally. The expansion cooling of the combustion gas is especially counteracted by appropriate measures. This applies particularly to applied ignition internal combustion engines. For a compression ignition internal combustion engine however, the method is preferably caused to take place adiabatically, since the inlet temperature and the inlet pressure will thereby be reduced, thus also reducing the average pressure and, in consequence, the $NO_x$ emission.

The combustion gas or air may be preheated by means of the mechanical energy released from the gas engine, enabling a thermodynamically more favourable combustion to be achieved in the internal combustion engine.

Furthermore, it is possible, by means of the pressure of the combustion gas between the internal combustion engine and the gas engine, to regulate the fuel supply to the internal combustion engine, and thus to eliminate the connecting elements to the load regulator of the engine otherwise necessary for this purpose.

Further advantageous regulating systems may be operated in conjunction with the method in accordance with the invention. For example, by means of electronically actuated correction elements it is possible and advantageous in internal combustion engines with compression ignition to raise and maintain the pressure in the intake pipe above atmospheric pressure under extremely low load conditions, such as idling, and/or when cold starting, thus avoiding undesired idling needles and to assure ignition of the injected jet in every case. In another embodiment, the peak pressure and the absolute pressure in the intake pipe is regulated as a function of the temperature and independently of the external pressure, in order to "protect" the engine at high engine temperatures and/or to have the full engine output available when travelling at high altitudes.

In yet another embodiment it is possible to regulate the recycled exhaust gas quantity via the pressure state in the intake pipe by means of the gas engine and thereby to limit the exhaust gas recycling system to a line comprising a non-return valve. Mixture conditions between conventional exhaust gas recycling systems and a partly quantitative regulation of the charge are hereby rendered possible, it being possible to keep the throttle losses to a minimum since they are at least partially recovered.

According to another aspect of the invention, apparatus for carrying out the method comprises an internal combustion engine provided with a gas engine having its gas outlet connected to the intake of the internal combustion engine so that the combustion gas (e.g. air or a mixture of air and fuel) for the internal combustion engine is delivered through the gas engine, the gas engine being drivingly coupled with the internal combustion engine and including a control device for varying the gas flow rate through the engine, and hence the delivery of combustion gas to the intake of the internal combustion engine, in the sense of a desired change in load on the internal combustion engine.

The rotational speed ratio between the internal combustion engine and the gas engine may be fixed and the control device may comprise a displaceable control edge in the gas inlet region of the gas engine. This arrangement is preferred for gas engines with internal expansion, since it achieves the result that, for example by means of the load switch (load regulator) of the internal combustion engine, the pressure ratio between the gas outlet region and the working space of the gas engine and also the required flow rate of combustion gas can be influenced.

In another arrangement, however, the rotational speed ratio between the internal combustion engine and the gas engine is fixed and the control device comprises an inlet valve of the gas engine having a variable opening time.

Alternatively, the rotational speed ratio between the internal combustion engine and the gas engine may be fixed and the working volume of the gas engine is arranged to be varied. This may be achieved by means of a variable eccentricity of the gas engine, which, particularly in the case of piston engines, is relatively simple to provide.

As already mentioned, the method of the invention may comprise varying the rotational speed ratio between the combustion engine and the gas engine, this being preferred particularly for gas engines with external expansion. The rotational speed of the gas engine in this case may be matched to the flow rate of the combustion gas corresponding to the load demand by means of a preferably infinitely adjustable gear.

The gas engine may be constructed as a so-called rotary piston engine, and when the control device comprises a displaceable control edge in the gas inlet region of the engine, this may consist of a fixed, radially oriented control edge on the engine casing, and a rotatable, axially disposed cover disc having a gas inlet aperture with a further control edge. Alternatively, the control device may consist of a control edge which is rotatable about the piston axis and extends substantially parallel to it in the gas inlet region.

A load-dependent supercharging of the internal combustion engine can be achieved with a gas engine in the form of a rotary piston engine, by providing the gas engine in its gas outlet region with a control edge which is rotatable about the piston axis and extends substantially parallel to it. If control edges rotatable about the piston axis and extending substantially parallel to it are provided both in the gas inlet region and in the gas outlet region, these may be coupled together and, for example, controlled jointly by the load switch of the internal combustion engine.

Preferably the gas engine is of the rotary vane-type having a plurality of vanes rotatably mounted about a first axis and projecting outwards through openings in a rotor which is mounted for rotation about a second axis eccentric with respect to the first axis, and sealing strips mounted adjacent the openings for sealing between the rotor and the vanes, and preferably the sealing strips are alternately fixed and resiliently mounted.

By a preferably load-dependent heating of the gas outlet region of the gas engine, it is possible to operate this engine isothermally.

Preferably, the control device of the gas engine is connected to the load regulator of the internal combustion engine by means of an actuating element.

Due to the fact that the pressure of the combustion gas between the intake pipe of the internal combustion engine and the gas outlet region of the gas engine positively depends upon the position of the control device at the gas engine and upon the rotational speed of the internal combustion engine, this pressure can be used to regulate the supply of fuel to the internal combustion engine by means of a pressure sensor disposed between the intake and the gas engine, and of a correction device disposed downstream from the pressure sensor. The correction device may, for example, operate pneumatically, by being connected on the one hand on the gas side with the intake pipe of the internal combustion engine by an adjuster bypass possibly furnished with a throttle, and on the other hand by being connected mechanically with the flow adjuster of a fuel delivery pump. Electrically energised correction devices are, of course, also possible, especially when the correction device is controlled by a micro-computer, which can also receive signals other than those from the aforementioned pressure sensor, such as signals representative of rotational speed, the setting of the load regulator, the actuating speed of the load regulator, and other parameters, and which it processes according to a predetermined programme and evaluates accordingly for the control of the supply of fuel to the internal combustion engine.

Examples of the method and apparatus in accordance with the invention will now be described with reference to the accompanying drawings, in which.

Figure 1:
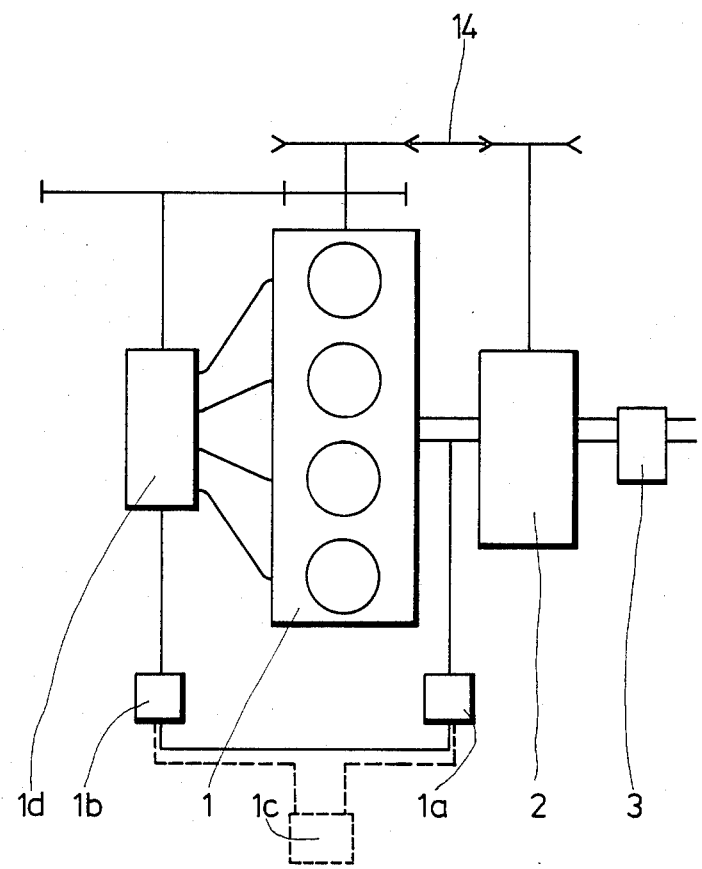
FIG. 1 is a schematic diagram of an internal combustion engine provided with a gas engine and arranged to carry out the method.

In the arrangement illustrated in FIG. 1, an internal combustion engine 1 is drivingly coupled by a gear 14 with a gas engine or rotary vane type positive displacement device capable of operation of a fluid motor or a fluid compressor 2, which possesses a control device 3 for varying the flow rate of combustion gas (usually air) through the gas engine to the internal combustion engine. The fuel supply rate to the engine 1 is regulated by means of a pressure sensor 1a in the gas path between the internal combustion engine and the gas engine 2, and a control element 1b which is influenced by the pressure sensor and which controls the device 1d, for example an injection pump, provided for supplying fuel to the internal combustion engine. A microcomputer 1c for taking account of further information concerning the operating state of the internal combustion engine 1 may be connected before the correction element 1b, as shown by the dashed lines.

Figure 2:
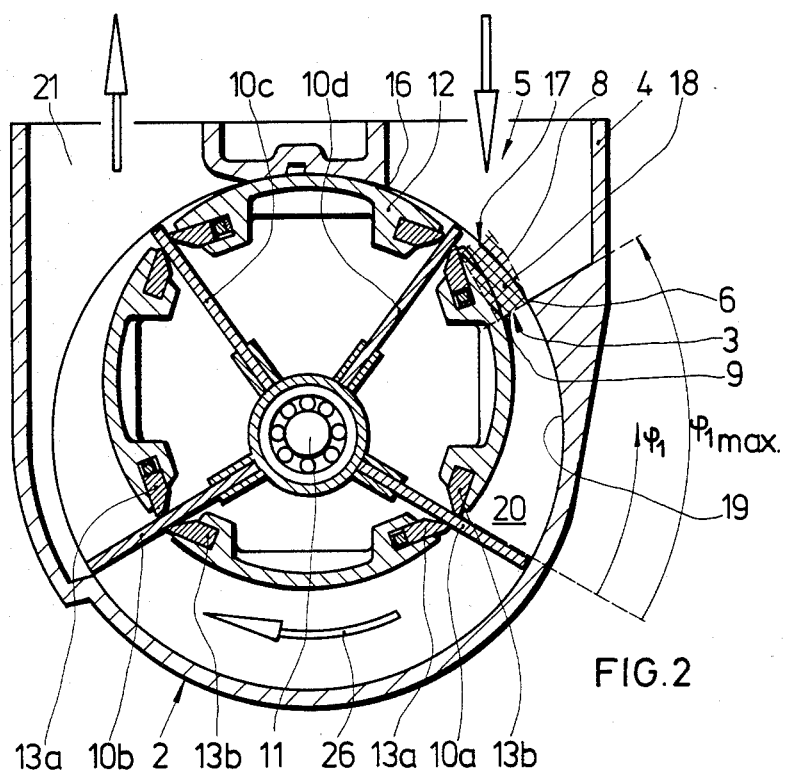
FIG. 2 is a radial section through one form of gas engine or rotary vane type positive displacement device which can be used in the invention.
Figure 2A:
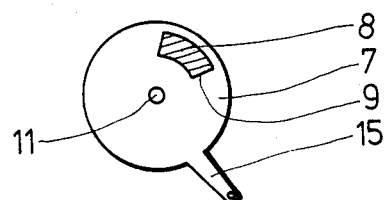
FIG. 2a is a view of a component of the gas engine of FIG. 2.

In the embodiment of FIG. 2, the gas engine or rotary vane type positive displacement device operating as a fluid motor 2 operates with internal expansion, and the control device 3 consists of a fixed control edge 6, radially disposed on the engine casing 4 in the gas inlet region 5, and a cover disc 7 which is disposed axially in one or both front planes of the gas engine 2 and which comprises an axial gas inlet aperture (shown hatched) 8 with a further control edge 9. The disc 7 is only partly indicated in FIG. 2 but is shown clearly in FIG. 2a. The gas engine 2 is constructed as a so-called vane-type engine with rotating vanes $10a, \ldots 10d$ which revolve about an axis 11 (rotary vane axis) with low friction and which drive or are driven by an eccentrically mounted cylindrical rotor 12 having openings through which the vanes project and which carry sealing strips $13a, 13b$. The rotor 12 is drivingly coupled via the gear 14, illustrated schematically in FIG. 1, with the internal combustion engine 1. The cover disc 7 is rotatable about the vane axis 11 and is coupled via a lever arm 15 with the load switch (not illustrated) of the internal combustion engine 1. The control edge 9 of the cover disc 7 can be rotated by means of the lever arm 15 through the angular zone $\rho_{1\ max}$ (FIG. 2). If the cover disc 7 is so rotated that the gas inlet aperture 8 with its control edge 9 is at the angular position $\rho_1 = \rho_{1\ max}$, then the combustion gas can enter the working space 20 of the gas engine 2 both through a gas inlet gap 17 bounded by the control edge 6 and a casing edge 16 (or rotary blade $10d$), and also through a gap 18 (shown double hatched) exposed by the gas inlet aperture 8 in the cover disc 7 and bounded by the rotor 12, the wall 19 of the working space 20, the blade $10d$ and the control edge 9. If the rotor 12 now rotates sufficiently far for the rotary blade $10d$ to travel over the control edge 6, then the delivered gas volume is fixed by the boundaries of the blades $10a$ and $10d$ and of the rotor 12 and the wall 19. This volume is increased by the further rotation of the rotor until the maximum working space volume is reached, i.e. between the blades $10a$ and $10b$ in the position of the rotor illustrated, and from then onwards the combustion gas is expelled into the gas outlet region and discharged to the internal combustion engine. The illustrated control edge position $\rho_1 = \rho_{1\ max}$ corresponds to the lowest part load range (idling) of the internal combustion engine 1. $\rho_1$ is changed by rotating the cover disc 7 in the rotational direction of the gas engine 2 towards 0 as the load on the internal combustion engine is increased, the maximum possible charge being reached with the setting $\rho_1 = 0$.

The increase in the flow rate of combustion gas or fluid delivered by the gas engine 2 is consequently achieved by increasing the effective gas inlet gap, i.e. through gap 18.

By rotating the cover disc 7, any desired degree of charging of the internal combustion engine can be obtained within the above-stated limits, the control edges taking over the function of the hitherto usual throttle valve, without thereby any notable throttle loss occurring, because the pressure differences upstream and downstream of the active chamber exert upon the vanes a force which is transmitted through the rotor 12 and the gear 14 to the engine 1.

Figure 3:
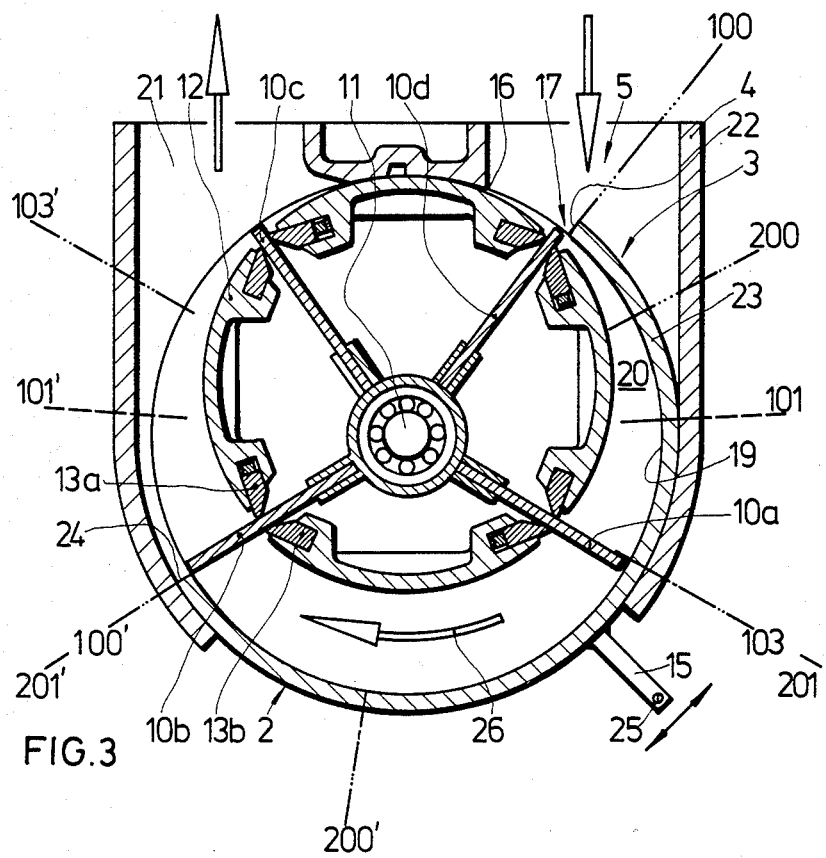
FIG. 3 is a view similar to that of FIG. 2 but showing a different form of the gas engine.

In the embodiment of FIG. 3, instead of a cover disc, the gas engine shown has a rotatable wall segment 23 which forms part of the working space wall 19 and one end of which forms a control edge 22 which is rotatable about the vane axis 11 and extends parallel thereto. The wall segment 23 extends over a sufficiently large angular range of the working space wall 19 for its end opposite to the control edge 22 to act as control edge 24 for the gas outlet region 21. A lever arm 15 with a pivotal connection 25 on the wall segment 23 (control segment) is provided for rotating the segment, for example by coupling it to the load switch of the internal combustion engine.

The position of the control segment 23 illustrated in FIG. 3, with the control edge 22 in position 100 and the control edge 24 in position 100′, corresponds to the lowest load state (idling) of the internal combustion engine. A displacement (rotation) of the segment 23 in the direction of the rotational arrow 26 to move the control edges 22 and 24 into approximately the positions 101, 101′ respectively would correspond to the maximum output of the internal combustion engine 1, operated as a pure suction engine. The angular range between the positions 101, 101′ respectively and 103, 103′ respectively then corresponds to outputs supercharging the engine 1 up to a maximum output.

In all cases in which the gas engine can operate as a mechanical supercharger for the internal combustion engine, the maximum suction volume of the gas engine corresponds to that of the internal combustion engine, increased by the desired maximum increase in charge. The gas engine shown in FIG. 3 can, however, also be used exclusively for recovering the throttle energy if the control segment 23 is formed so that its peripheral extent is indicated by the positions 200 and 200'. These positions would correspond to idling, whereas for the full load of the suction engine, the segment 23 would be moved to positions 201, 201'.

Figure 4:
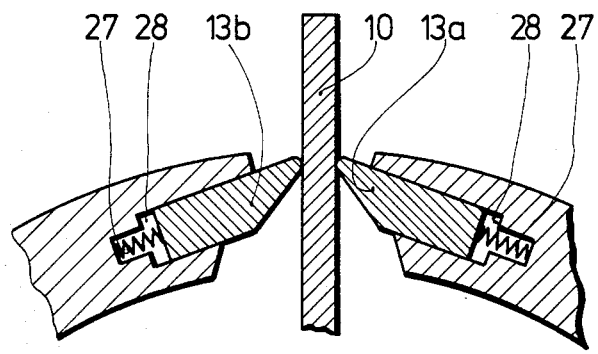
FIG. 4 is an enlarged sectional view showing a modification of a part of the gas engines shown in FIGS. 2 and 3; and, FIG. 5 is a consumption characteristic diagram of an Otto engine with and without energy-saving charge control by the method of the invention.

In FIG. 4, there is shown in detail how the sealing strips 13a, 13b of the rotor 12 for sealing against the rotary blades 10 can be matched by springs 27 and shoulders 28 carried by the rotor 12 to the requirements under alternating pressure loadings.

Figure 5:
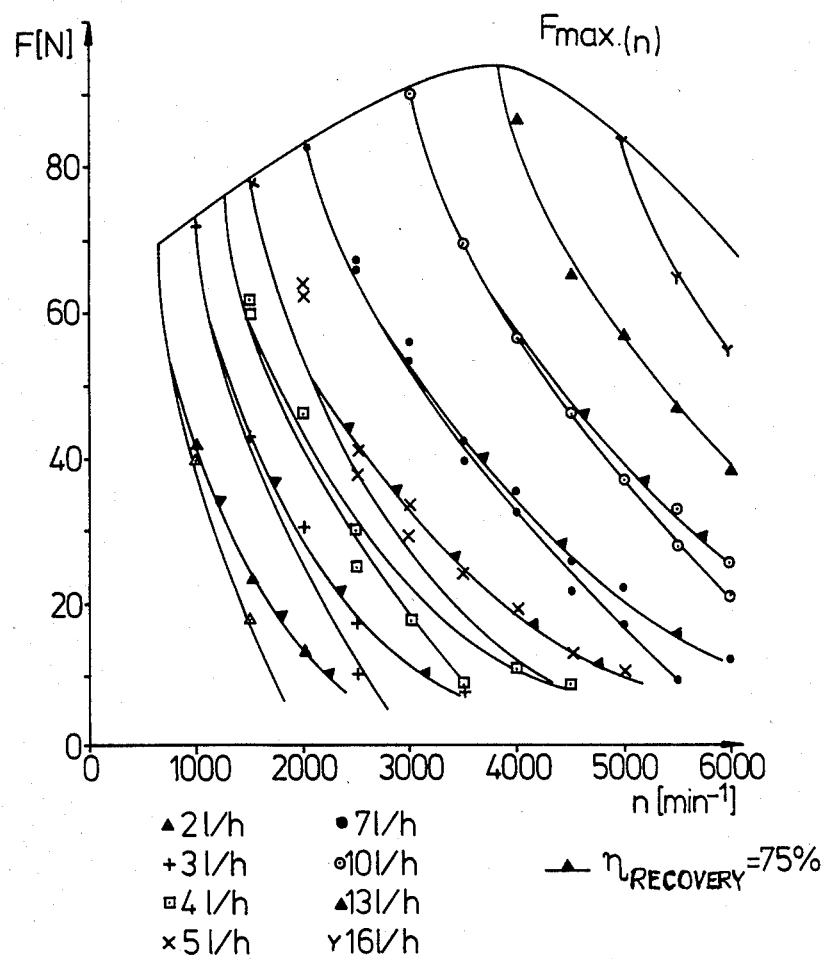

FIG. 5 shows a typical fuel consumption characteristic field of an Otto engine of 1300 cm$^3$ swept volume; the curves shown applying each to one specific fuel consumption (parameter), the left curve having been measured, whereas the right curve in each case was established by calculation on the assumption that 75% of the throttle energy can be recovered by operating the method in accordance with the invention. FIG. 5 shows, especially for the lowr load range (lower regions of curves), a clear displacement of the fuel consumption towards lower values. The computer model was based upon an assumed isothermal working cycle.

The stated efficiency of recovery of throttle energy (mean value) assumes that mechanical losses of the gas engine are reduced as far as possible. For example, for an elongated two-chamber rotary blade supercharger with three blades to each chamber, with an initial gas inlet volume of 780 cm$^3$, a gap length of 430 mm and a maximum rotational speed of 7,500 rpm, and also a coefficient of friction of the sealing strips of 0.18, the delivered volume must be reduced to 660 cm$^3$ and the gap length to 270 mm, the maximum rotational speed must be increased to 8,250 rpm, and the friction coefficient of the sealing strips reduced to 0.08. Moreover, taking into account the centrifugal influence upon the sealing strips at high rotational speeds, the sealing prestress should also be reduced. Further measures may consist in the reduction of gap leakages by coating the engine and casing internal surfaces and in the reduction of sealing strip friction by using surface-treated materials.

In apparatus in accordance with the invention, the cold output released in the part-load range (due to gas expansion) can be utilised for air conditioning devices on the internal combustion engine or the working appliance in which it is used. Furthermore, a partly quantitative charging control in diesel engines in the part-load range is also possible, by which, while avoiding exhaust gas recycling, a reduction in $NO_x$ can be achieved.

We claim:

1. A method of regulating the supply of combustion fluid to an internal combustion engine from a positive displacement device capable of operating as a fluid motor or a fluid compressor, varying the rate of flow of the combustion fluid depending on the desired change of load in the internal combustion engine, utilizing a control device for the positive displacement device operating as a fluid motor for varying the rate of flow, coupling the internal combustion engine in a force-locking manner with the positive displacement device, feeding fluid to the positive displacement device in unthrottled suction lines and subsequently, at least partially, displacing the fluid in an unthrottled connecting line to the internal combustion engine, wherein the improvement comprises in the partial load range of the combustion engine feeding the fluid to the positive displacement device operating as a fluid motor in the unthrottled suction lines at a higher pressure than the displacing pressure out of the positive displacement device in the unthrottled connecting line for flow into the internal combustion engine.

2. A method, as set forth in claim 1, including preheating the combustion fluid by using the mechanical energy released in the positive displacement device operating as a fluid motor.

3. A method, as set forth in claim 1 or 2, including regulating the flow of fuel to the internal combustion engine by means of the pressure existing between the positive displacement device and the internal combustion engine.

* * * * *